Nov. 5, 1968   J. M. McCOOL ET AL   3,409,869

DEEP SUBMERGENCE ACOUSTIC TRANSDUCER ARRAY CONSTRUCTION

Filed July 21, 1965

INVENTORS.
JOHN M. McCOOL
SHELBY F. SULLIVAN
BY V. C. MULLER
ATTORNEY.

३,४०९,८६९
Patented Nov. 5, 1968

3,409,869
DEEP SUBMERGENCE ACOUSTIC TRANSDUCER ARRAY CONSTRUCTION
John M. McCool, Altadena, and Shelby F. Sullivan, Arcadia, Calif., assignors to the United States of America as represented by the Secretary of the Navy
Filed July 21, 1965, Ser. No. 474,541
1 Claim. (Cl. 340—9)

ABSTRACT OF THE DISCLOSURE

A basic underwater acoustic transducer array construction consisting of a rubbery acoustic lossy material layer over a rigid reinforcing structure, pockets of rubbery material having good acoustic transmission properties formed in the outer face of the lossy layer, and the individual transducer elements imbedded in the pockets of acoustic transmitting material. The transducer elements are spaced apart by λ/2 or less. The lossy and transmitting materials have acoustic impedances approximating that of water.

---

The invention described herein may be manufactured and used by or for the Government of the United States of America for governmental purposes without the payment of any royalties thereon or therefor.

This invention relates to underwater directional transducer array apparatus, of the type in which the individual transducer elements are disposed in a predetermined array pattern with the distances between individual elements substantially one-half wavelength (λ/2), or less. The improvement of the invention relates to a novel basic structural arrangement for mounting individual transducer elements to a rigid reinforcing structure, and which has particular utility where required to operate at considerable depths of submergence, of the order of 500 feet beneath the surface, and even somewhat deeper.

Directional transducer array apparatus of the type referred to, i.e., formed of array patterns of transducer elements spaced by distances substantially equal to λ/2, or less, are employed where compactness is desired, such as in transducer arrays mounted on submarines. Prior art apparatuses simply consist of mounting the rigid transducer elements to the reinforcing structure by a form of construction chosen for its structural properties. The disadvantage of this is that various sorts of undesired mutual intercoupling effects occur through the medium of the reinforcing structure, and the elements therefore do not have the independence of their individual response characteristics necessary to provide free field boundary conditions between adjacent elements. Without free field boundary conditions, the conventional calculations for synthesizing desired directional characteristics cannot be employed. It is therefore necessary to employ tedious cut-and-try adjustment of the shading networks for the individual elements, in order to obtain directionally sensitive characteristics. The seriousness of the problem is best pointed out by the fact that even where array units are alike in every physical detail, their shading networks must be individually and tediously adjusted.

Other prior art approaches to the construction of compact arrays include use of an acoustic reflecting material behind the individual elements of the array. While this approach permits synthesis of desired directional characteristics by conventional calculations, it is not suitable for deep submergence applications, where weight is important. The trouble with this approach is that reflecting material must either be a high density material, which would lead to undue array weight, or a low density material containing air cells or other voids. Low density materials are unsatisfactory for operation in the range of depths, mentioned above, because their acoustic properties change significantly under the pressures encountered, and because of other reasons including the fact that most of these materials have low crush strengths.

Accordingly, the objectives of the invention are to provide:

(1) A novel basic structural arrangement for mounting individual transducer elements to a reinforcing structure to provide an array pattern which permits synthesis of desired directional characteristics by conventional calculations.

(2) The basic structural arrangement in accordance with the previous objective, and which is further capable of operation over a range of depths extending down to a maximum depth of submergence of the order of 500 feet beneath the surface, and even somewhat deeper.

(3) An improved directional underwater acoustic transducer array which is compact, light in weight, and capable of operating in a range of depths extending down to a maximum depth of submergence of the order of 500 feet, and even somewhat deeper.

Other objects, advantages and novel features of the invention will become apparent from the following detailed description of the invention when considered in conjunction with the accompanying drawings wherein.

Figure 1:
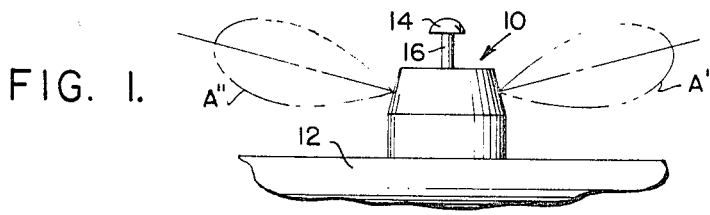
FIG. 1 is a side elevation of transducer apparatus for an antisubmarine sonar surveillance system, shown mounted on the upper hull structure of a submarine.
Figure 5:
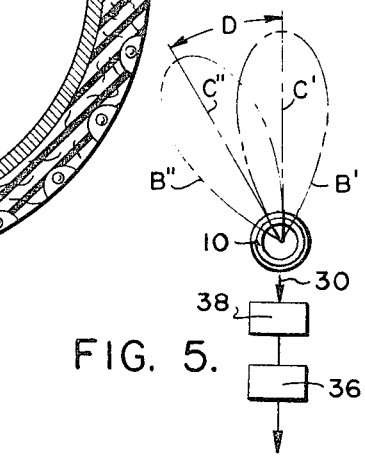
FIG. 5 is a block diagram of certain of the sonar system components.

Referring now to the drawing, and in particular to FIG. 1, the present invention is illustrated by an embodiment of receiving array 10 mounted on the upper hull structure of a submarine 12. Array 10 is part of an antisubmarine warfare sonar surveillance system. The sonar system is of the active mode or echo type, and has a transmitting transducer 14 mounted on a short mast which elevates it above the receiving transducer. The transmitting transducer 12 has a radiation pattern, not shown, which is omnidirectional in the horizontal plane and is inclined upwardly from the horizontal in the vertical plane. The receiving array 10 has the shape of a frustrum of a cone. Array 10 is adaptable to provide receiving beam sensitivity patterns in a vertical plane, such as beam patterns A' and A", having their axes disposed in a perpendicular or normal relationship to the frustoconical array surface. It is to be noted that beam patterns A' and A" are but two of a plurality of separately formed, but simultaneously present beam patterns, which are produced by means of associated conventional delay network circuitry. These will be more fully described in connection with FIG. 5, later in this specification, where horizontal plane beam shaping is discussed. The purpose of the frustoconical shape is to cause these receiving array vertical plane beam patterns to be inclined upwardly from the horizontal. The sonar surveillance system is adapted for operation with the submarine running at a considerable depth of submergence, and the upward inclination angles of the transmitting transducer and receiving transducer vertical plane beam patterns permits the sonar system to provide surveillance coverage of the ocean strata above the depth at which the submarine is running, and over an annular region of the ocean centered about the vertical axis through mast 16 and the center of array 10. The transmitting transducer 14 is mounted above the receiving array to minimize coupling of the transmitted signal to the receiver section of the sonar.

Figure 2:
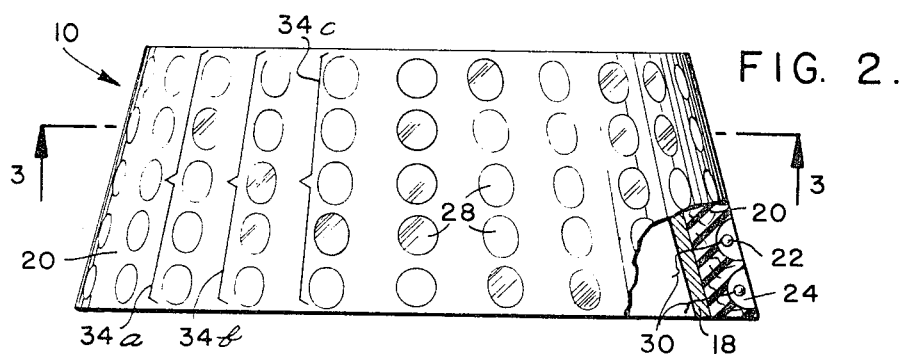
FIG. 2 is an enlarged side elevation of the receiving array element of the transducer apparatus of FIG. 1.
Figure 3:
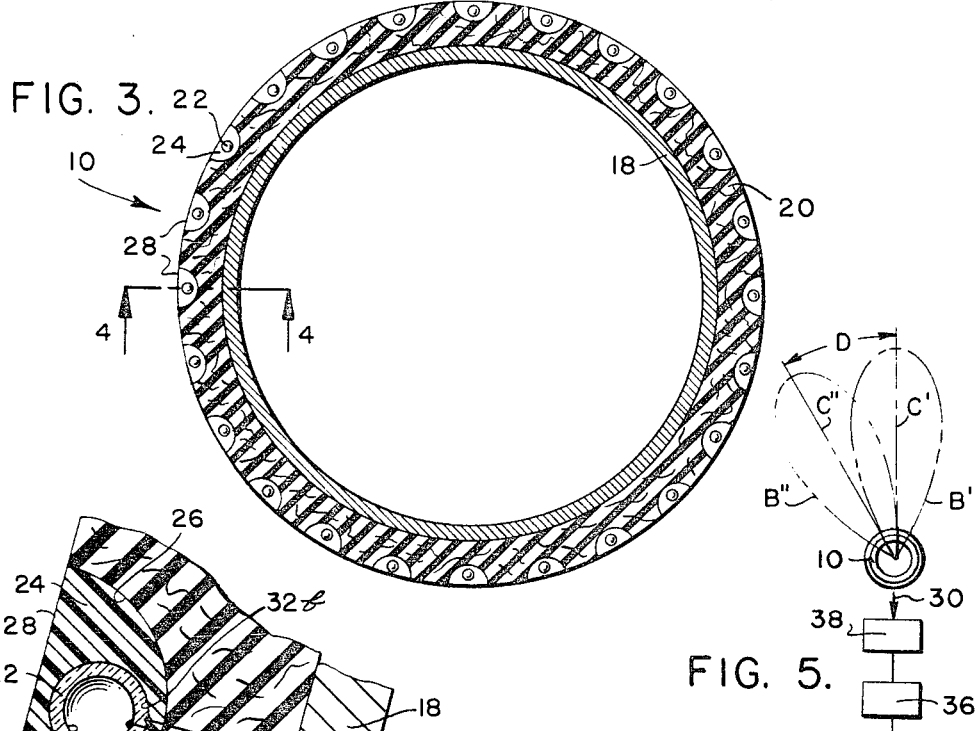
FIG. 3 is a section taken along line 3—3 of FIG. 2.

Referring now to FIGS. 2 and 3, array 10 comprises a rigid, shell-like frustoconical frame 18, of a suitable material such as aluminum. The outer surface of frame 18 is covered by a rubbery layer 20 having a high acoustic absorption coefficient, and having a characteristic acoustic impedance which substantially matches that of seawater, as well. A preferred range of values of absorption coefficient is 40–80 db of loss per wave length of linear distance of acoustic energy travel. Compositing rubbery materials having this combination of characteristics as amorphous suspension of fine flakes of a low atomic weight metal in a rubber base medium is conventional. It is particularly significant to note that the conventional process by which this material is composited results in a finite thin film of air about each flake. In accordance with known theory, this finite thin film of air is necessary in the physical mode by which the composition exhibits high acoustic absorption, or "lossy," characteristics.

Figure 4:
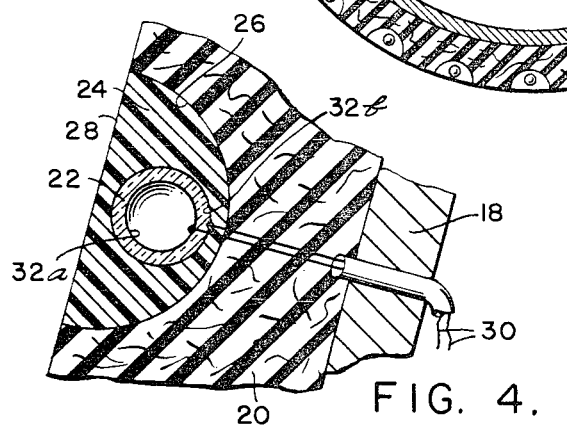
FIG. 4 is an enlarged section taken along line 4—4, FIG. 3.

As best shown in FIG. 4, the individual transducer elements 22 which form the array, are each embedded in a rubbery matrix 24 having a low acoustic absorption coefficient and having a characteristic acoustic impedance which substantially matches that of seawater, as well. Each acoustic coupling matrix 24 is set into the outer surface of absorptive layer 20, the matrix filling an outwardly opening semispherical cavity 26 formed in the surface of layer 20. Each matrix is bonded in place in the cavity in which it is mounted. The outer faces 28 of the matrices are shaped to conform to the frustoconical outer surface of absorptive layer 20. More specifically, the matrices 24 are made of any of the well-known rubber compounds employed as so-called acoustic window elements in the construction of underwater sound devices. Preferably, the value of acoustic absorption coefficient for this material is less than 5 db of loss per wavelength of linear distance of acoustic energy travel.

Transducer elements 22 are preferably of the hollow spherical type made of electrostrictive material, as has been shown in the drawing. This type of transducer, which is commercially available, is provided with lead wires 30 connected to a pair of electrodes 32a and 32b formed as metallic coatings on the inner and outer surfaces of the hollow sphere. The lead wires are suitably communicated through the rubber materials and through the wall formed by frame 18, and extend into the central space within the frame for connection to the beam pattern forming circuitry.

The transducer elements 22, and their surrounding acoustic coupling matrices 24, are arranged about the outer surface of absorptive layer 20 in equiangularly spaced rows of "staves" 34a, 34b, etc., FIG. 2, of transducers aligned in the vertical direction along the frustoconical surface, with the center-to-center spacing between adjacent elements in each stave, and between adjoining elements in adjacent staves substantially equal to, or less than, λ/2. Because the transducer elements are embedded in matrices 24 of the acoustic coupling medium, each transducer has an effective aperture area as large as the front face 28 of the matrix. Since matrices 24 have a characteristic impedance matching that of seawater, the diffraction effects occurring at their seawater interface are also minimized. The absorptive layer 20 provides isolation between adjacent transducer elements and between the elements and the rigid frame, which is potentially an undesired high velocity path for the acoustic energy, and could result in undesired coupling between even remotely located elements. The use of materials having characteristic acoustic impedances matching seawater in the construction of absorptive layer 20 as well as the construction of acoustic coupling matrices 24, avoids undesired reflection interference effects at the interfaces formed where the matrices are bonded in the cavities 26. It has been found that the combination of increasing the effective aperture area of the transducer by means of the acoustic coupling matrices 24, and the minimizing of mutual coupling and reflective interference effects by means of absorptive layer 20 and impedance matches across critical interfaces results in the existence of substantially free field boundary conditions between adjacent transducer elements of the array. Suitable conventional beam forming delay network circuitry 36, FIG. 5, simultaneously forms a plurality of horizontal plane directional sensitivity patterns, such as patterns B' and B''. Circuitry 36 is so designed to provide predetermined angular spacing between the beam axes C', C'' represented by angle D, between the beam axes. The vertical plane sensitivity pattern of these directional beams are like the beam patterns A' and A'' described in connection with FIG. 1. The outputs 30, of the individual transducers are coupled to the delay network circuitry through a suitable multiple connection 38. Circuitry 36 may be designed by classical array pattern calculations for free field transducer elements spaced apart by distances equal, or less than λ2.

The rubbery materials from which absorptive layer 20, and acoustic coupling matrix 24 are made, have the property of being essentially incompressible in the range of depths extending down to a depth of 500 feet and somewhat beyond, in the same manner that an incompressible liquid such as water is incompressible in the same range of pressures. Therefore, the structural and the acoustic properties of absorptive layer 20 and acoustic coupling matrices 24 remain uniform over this range of depths. The spherical type of transducer element likewise has sufficient crush strength to withstand the pressures down to this depth, and to still remain sufficiently compliant to effectively operate as a transducer.

Obviously many modifications and variations of the present invention are possible in the light of the above teachings. It is therefore to be understood that within the scope of the appended claim the invention may be practiced otherwise than as specifically described.

What is claimed is:

1. In free field underwater acoustic transducer array apparatus of the type in which the individual transducer elements are separated by distances no more than λ/2, where λ is one wavelength at the desired frequency of operation, the construction, comprising, (a) a rigid frame forming a frame surface confronting the water medium, (b) a first sound absorptive material forming a continuous covering disposed over said frame surface and itself forming an outer matrix surface exposed to the water, said first material comprising an amorphous suspension of fine flakes of low atomic weight metal in a rubber base medium, said metal flakes being surrounded by a finite, thin air film and having an acoustic impedance approximately matching that of water, (c) said absorptive matrix having a predetermined pattern of spaced outwardly opening cavities formed in its outer face, said cavities having their centers separated by distances substantially no more than λ2, (d) a second sound transmitting material filling said cavities, said second material being a rubber material, alone, and bonded in place in each cavity and having an acoustic impedance approximately matching that of water, and (e) a transducer element imbedded in the medium in each cavity of the pattern of cavities.

References Cited

UNITED STATES PATENTS

| | | | |
|---|---|---|---|
| 2,380,931 | 8/1945 | Batchelder | 340—9 X |
| 2,760,181 | 8/1956 | Camp | 340—10 |

RODNEY D. BENNETT, *Primary Examiner.*

B. L. RIBANDO, *Assistant Examiner.*